United States Patent
Ley

(10) Patent No.: US 6,445,101 B2
(45) Date of Patent: Sep. 3, 2002

(54) CLUTCHLESS MOTOR DRIVE SYSTEM

(75) Inventor: Bruce C. Ley, Ossian, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/681,261

(22) Filed: Mar. 9, 2001

Related U.S. Application Data

(60) Provisional application No. 60/188,056, filed on Mar. 9, 2000.

(51) Int. Cl.[7] .................................................. H02K 3/00
(52) U.S. Cl. ........................................ 310/184; 318/751
(58) Field of Search ......................... 310/184; 318/751, 318/817

(56) References Cited

U.S. PATENT DOCUMENTS

| | | | | |
|---|---|---|---|---|
| 3,725,757 A | * | 4/1973 | Ehrens et al. ................ | 318/795 |
| 4,465,962 A | * | 8/1984 | Kirschbaum ................. | 318/813 |
| 4,467,257 A | * | 8/1984 | Douthart et al. ............ | 318/774 |
| 4,784,666 A | | 11/1988 | Brenner et al. ............. | 8/137 |
| 4,987,627 A | | 1/1991 | Cur et al. .................. | 8/158 |
| 5,130,624 A | * | 7/1992 | Bashark ...................... | 318/280 |
| 5,166,568 A | * | 11/1992 | Nystuen et al. ............. | 310/184 |
| 5,192,887 A | * | 3/1993 | Theis ........................ | 310/68 C |
| 5,211,037 A | * | 5/1993 | Adamski et al. ............ | 68/12.16 |
| 5,237,256 A | * | 8/1993 | Bashark ...................... | 318/280 |
| 5,582,040 A | | 12/1996 | Khan ......................... | 68/23.2 |
| 5,825,111 A | * | 10/1998 | Fei ............................ | 310/179 |
| 5,883,490 A | * | 3/1999 | Moreira ...................... | 318/772 |
| 6,151,742 A | | 11/2000 | Dausch et al. .............. | 8/158 |
| 6,175,208 B1 | * | 1/2001 | Rose .......................... | 310/254 |
| 6,241,782 B1 | | 6/2001 | Vande Haar ................. | 8/159 |

FOREIGN PATENT DOCUMENTS

EP        404375 A2 * 12/1990   ........... D06F/37/30

* cited by examiner

*Primary Examiner*—Joseph Waks
(74) *Attorney, Agent, or Firm*—Karl A. Vick, Esq.; Armstrong Teasdale LLP

(57) ABSTRACT

A motor drive system includes an electric motor including a rotor shaft, a first main winding and a second main winding. The first and second main windings are selectively energizable to operate the motor at first and second speeds, and at least one of the windings is a permanent split capacitor winding. A transmission is coupled to the rotor shaft, and the rotor shaft engages the transmission without employing a clutch mechanism.

23 Claims, 5 Drawing Sheets

CLUTCHLESS MOTOR DRIVE SYSTEM

CROSS REFERENCE TO RELATED APPLICATIONS

This application claims the benefit of U.S. Provisional Application Ser. No. 60/188,056 filed Mar. 9, 2000.

BACKGROUND OF INVENTION

This invention relates generally to electric motor drive assemblies, and more particularly, to clutchless PSC motor drive assemblies.

In many applications, known motor drive systems, such as, for example, a washing machine motor drive system, often include a dual speed 4 pole/6 pole electric motor, typically a split phase or capacitor start motor, coupled to a transmission for driving external components, such as, for example, a clothes basket and an agitator rotatably mounted within a washing machine cabinet. The split phase and capacitor start motors typically require slipping mechanisms, such as slipping belts or clutches, to mechanically unload the motor during starting, and further typically employ switches, such as centrifugal switches, to de-energize a start winding of the motor. However, both the slipping mechanism and start winding cutout switch increase manufacturing and assembly costs of the drive systems, as well as potentially reduce the reliability of the system due to failure and malfunction of the slipping mechanism and cutout switch. Furthermore, split phase and capacitor start motors are susceptible to relatively high torque pulsations, which can produce unpleasant noise that may lead to line rejects in manufacturing operations or field rejects by consumers when the drive system is installed in, for example, a household appliance.

Some attempt has been made to alleviate mechanical reliability issues in drive systems by using sophisticated electronic controls, such as computer-controlled triac switch systems, in conjunction with reversible motors. However, these systems tend to increase, rather than reduce, manufacturing costs. Moreover, complicated control systems introduce more reliability variables into the motor drive system that can ultimately reduce system reliability.

Accordingly, it would be desirable to proved a dual speed motor drive system with improved performance and reliability while reducing manufacturing and assembly costs by eliminating slipping mechanisms and cutout switches.

SUMMARY OF INVENTION

In an exemplary embodiment of the invention a motor drive system includes an electric motor including a rotor shaft, a first main winding and a second main winding. The first and second main windings are selectively energizable to operate the motor at first and second speeds, and at least one of the windings is a permanent split capacitor winding. A transmission is coupled to the rotor shaft, and the rotor shaft engages the transmission without employing a clutch mechanism. The motor may start in either the first and second speeds with sufficient starting torque and low inrush currents to avoid tripping of circuit breakers and opening of fuses, and without added expense and reliability issues of slipping clutch mechanisms. Moreover, the PSC motor eliminates a need for start winding cutout switches, and produces relatively low torque pulsation relative to conventionally used split phase and capacitor start motors, thereby further increasing drive system reliability and customer satisfaction.

In a further exemplary embodiment, the motor drive system is employed in a vertical axis washing machine, and includes a rotor shaft including an integral pulley. A belt is coupled to the pulley and engages a washing machine transmission. Because the motor generates sufficient starting torque in either speed of the motor, slipping clutches and slipping mechanisms are unnecessary. The motor includes a first start winding for rotating the motor shaft with the first main winding, a second start winding for rotating the motor shaft with the second main winding, and an extended main winding for tuning a strength of the motor between operation of the motor with only the first and second main windings. More specifically, in one embodiment, the first start winding is a 2 pole start winding, and the second start winding is a 4 pole start winding. Thus, the motor is operable in 2 pole mode, 4 pole mode, and using the extended means at modes between the two pole mode and 4 pole mode. Thus, greater motor speed distinctions and improved system performance are achieved.

A drive system of increased reliability and performance is therefore provided at reduced manufacturing cost by elimination of clutch mechanisms and cutout switches, and further with a lower cost motor than conventionally uses appliance motors.

Figure 1:
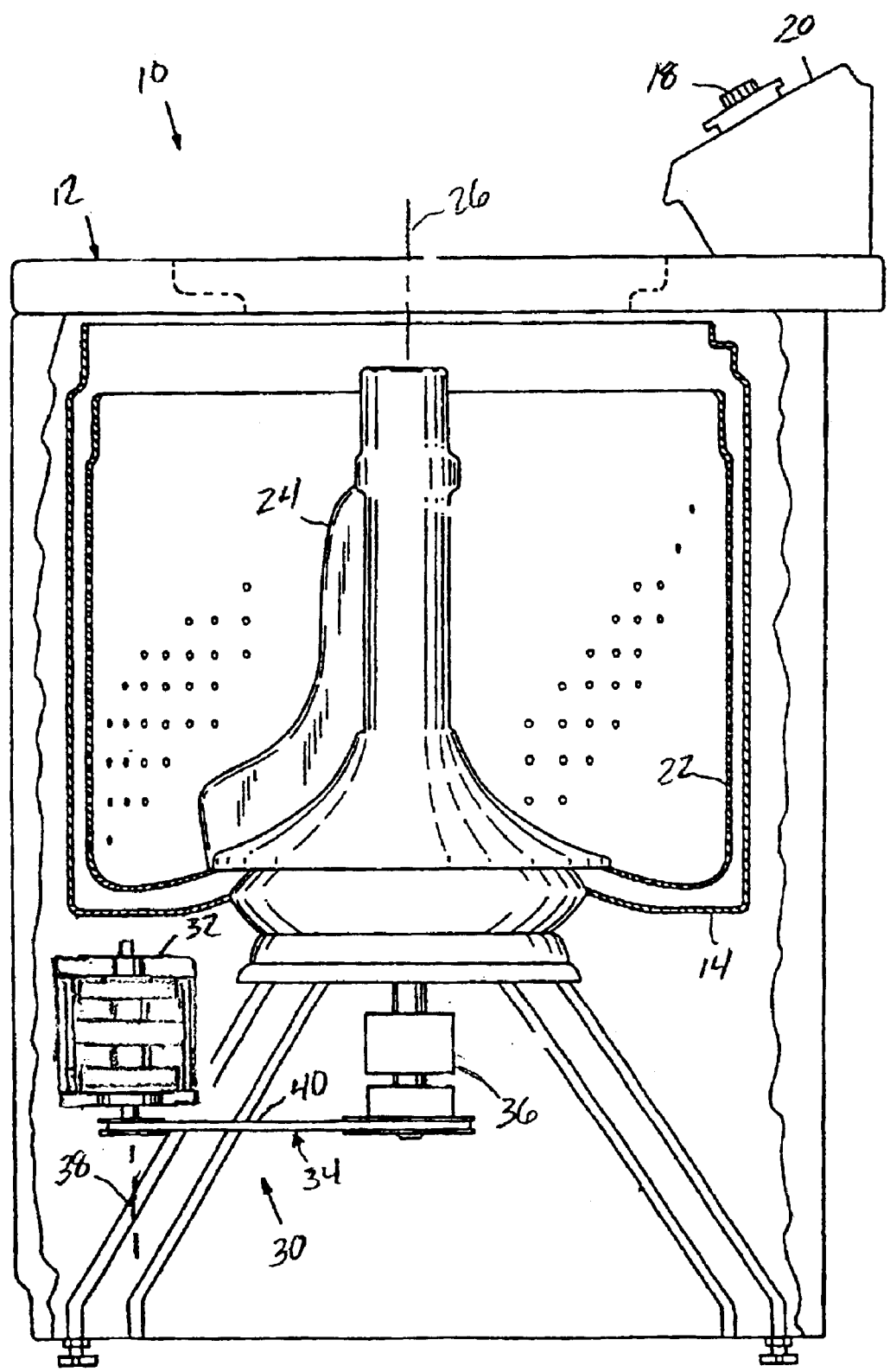
FIG. 1 is a side elevational, partially broken away view of an exemplary washing machine including a clutchless drive system.

FIG. front perspective view of a motor for the clutchless motor drive system shown in FIG. 1.

Figure 2:
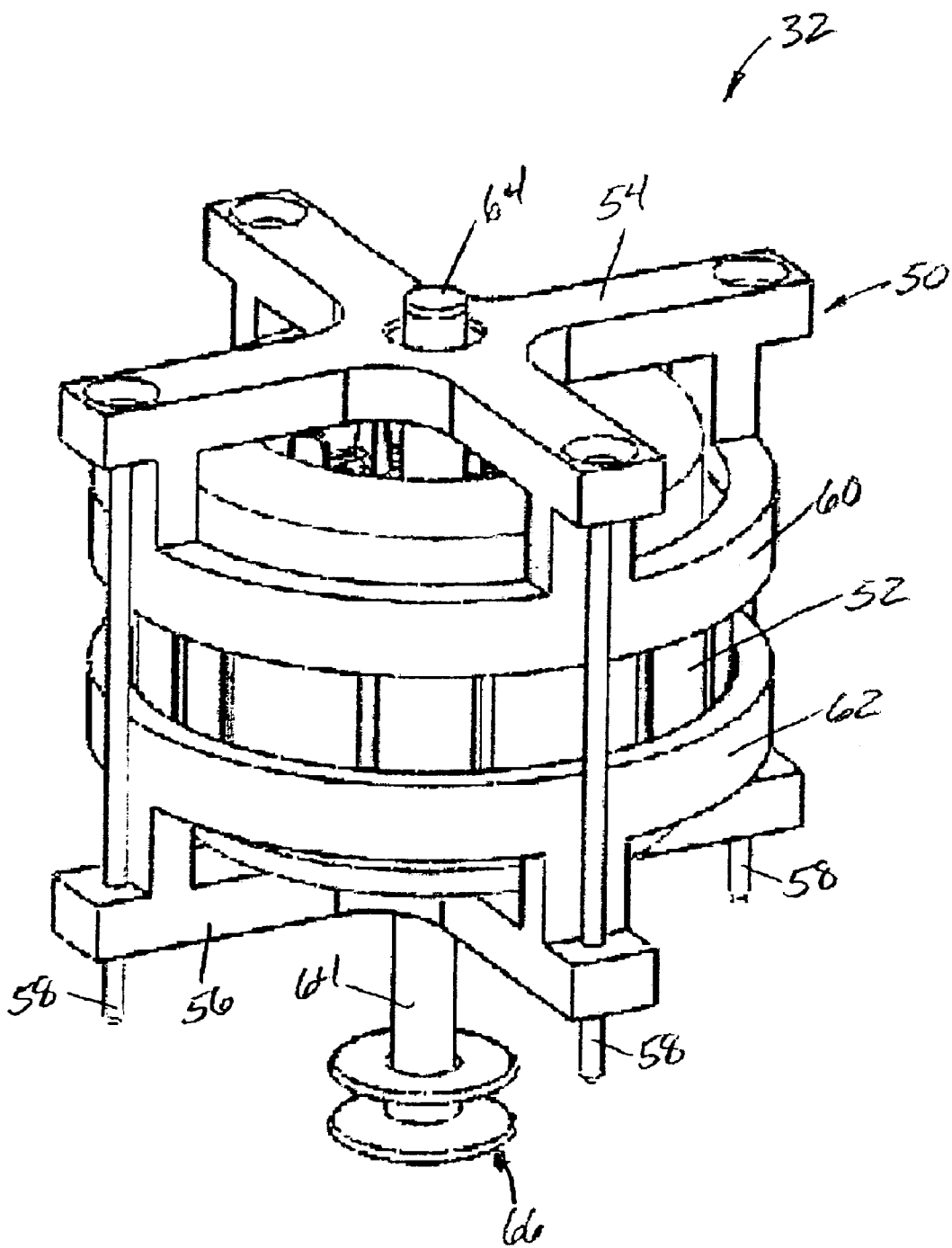
Figure 3:
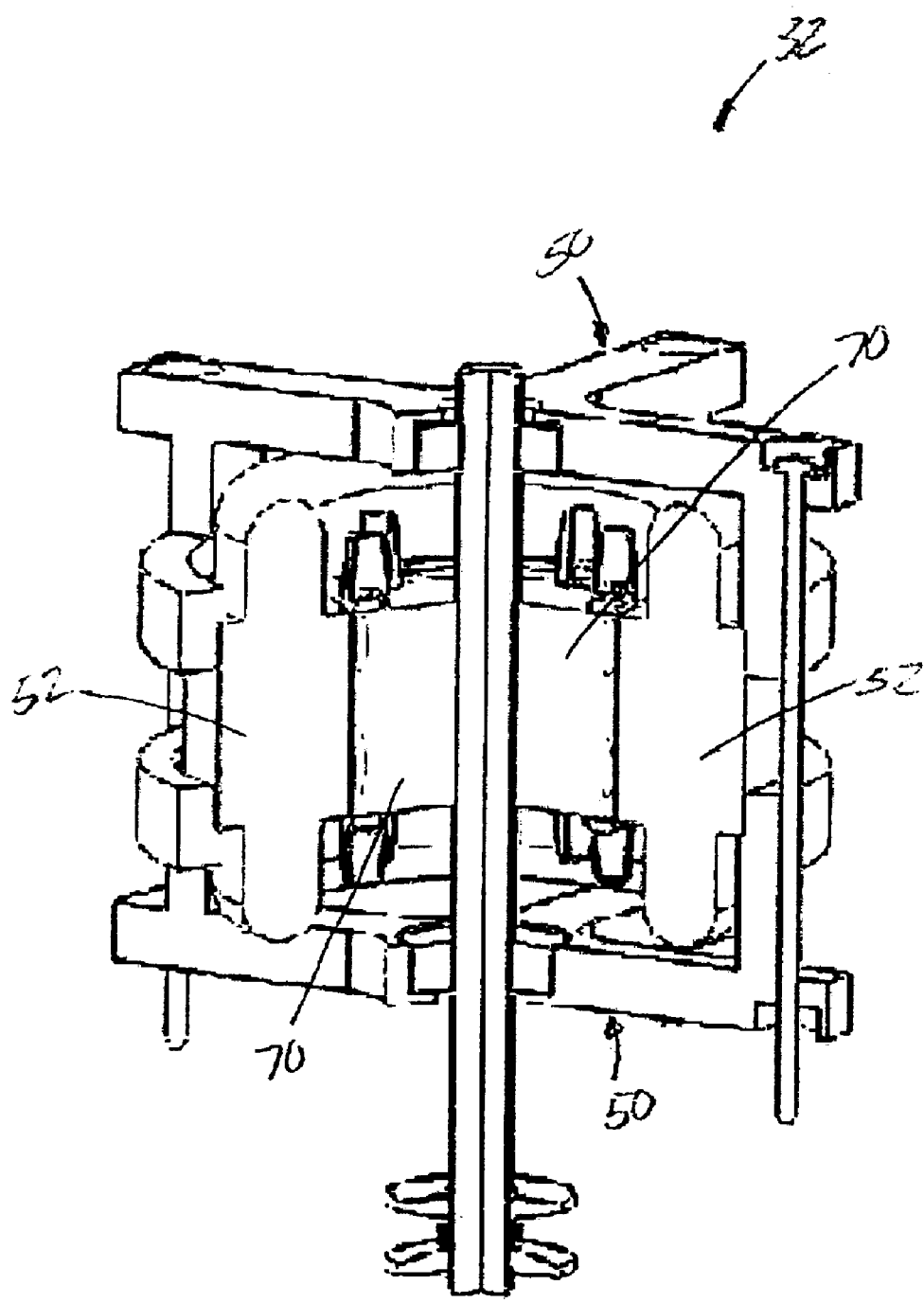

FIG. 3 is a partial perspective view of the motor shown in FIG. 2.

Figure 4:
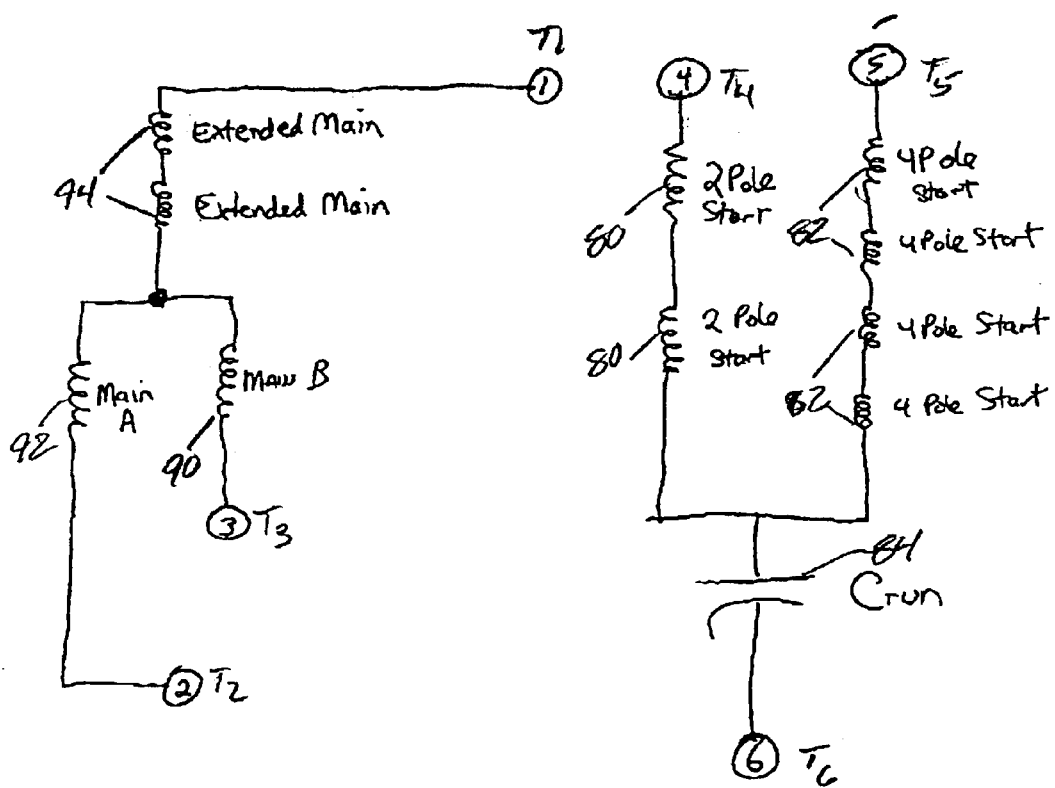

FIG. 4 is a circuit schematic of the windings for the motor shown in FIGS. 2 and 3.

Figure 5:
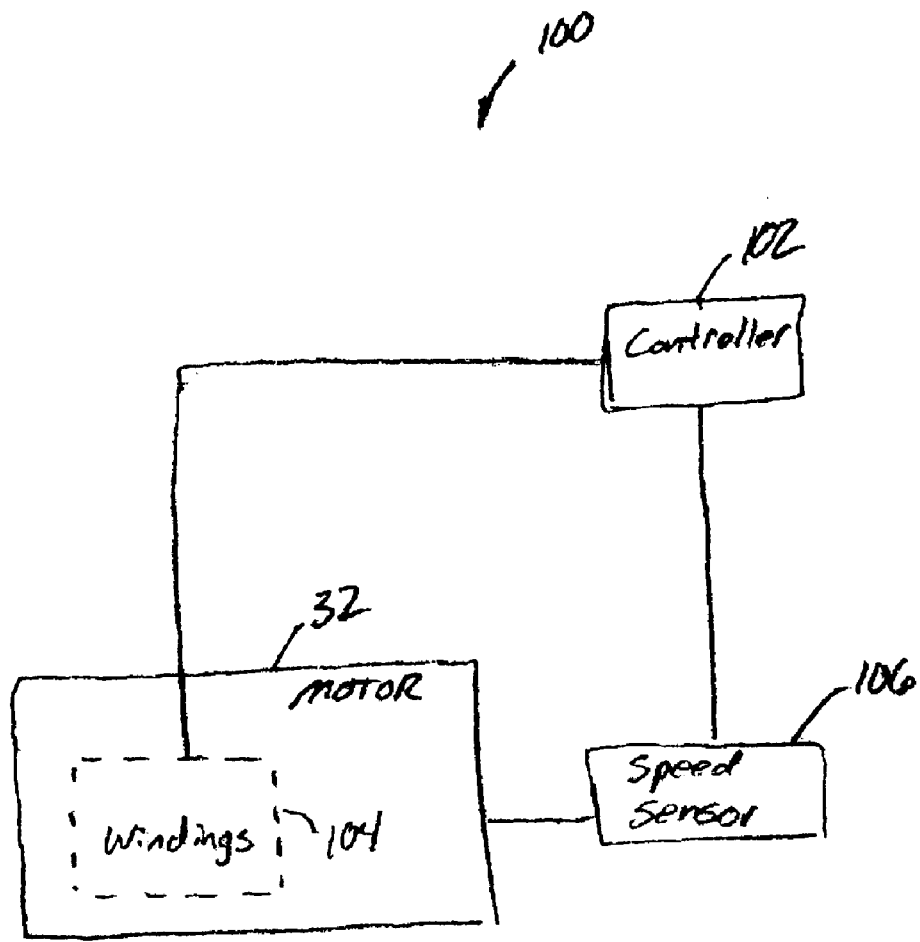

FIG. 5 is a schematic illustration of a control system for the clutchless drive system shown in FIG. 1.

DETAILED DESCRIPTION

The clutchless motor drive system of the present invention may be employed in a large variety of applications, and the resultant benefits accrue generally to all applications of the motor drive system. While the invention is described and illustrated herein in the context of a washing machine, it is contemplated that the invention could be used in other applications in which a clutchless dual speed motor drive system is desirable to produce rotary movement of a driven element. For example, the invention may be practiced in other household appliances, including but not limited to clothes dryers and dishwashers having rotatable elements to execute operational cycles of the appliance, as well as applications beyond household appliances. Therefore, the specific application described herein is for illustrative purposes only and is not intended to limit the invention is any aspect.

FIG. 1 is a partially broken away view of a conventional vertical axis washing machine 10, the construction and operation of which is well known in the art, and in which the present invention may be practiced. Washing machine 10 includes a cabinet housing 12 including an outer tub 14 adapted to be filled with wash water or rinse water through a fill tube (not shown) in response to manipulation of controls 18 located on a control panel 20 for user selection of desired machine cycles.

A clothes basket 22 is mounted within outer tub 14 and clothes disposed in clothes basket 22 are subjected to washing action by an oscillating agitator 24 located within clothes basket 22 during a wash or rinse cycle after introduction of water into outer tub 14. After each wash or rinse cycle agitation, clothes basket 22 is rotated about a vertical axis 26 at high speed in order to extract water from the clothes. The water is drained into a sump (not shown), and pumped to a drain (not shown) by a pump assembly (not shown).

Agitator 24 and clothes basket 22 are driven by a clutchless motor drive assembly 30 including a drive motor 32, a pulley system 34 and a known transmission 36 coupled to agitator 24 and clothes basket 22. Clutchless motor drive assembly 30 is operatively connected to control panel 20 and executes selected wash and rinse cycles of machine 10. In one embodiment, motor 32 is a dual speed, 2 pole/4 pole, permanent split capacitor (PSC) electric AC induction motor including a vertical longitudinal axis 38 that is substantially parallel to and offset from clothes basket vertical axis 26 for driving transmission of clothes basket 22 via a transmission belt 40. Transmission 36 includes known speed reducing elements (not shown) and is normally braked by a spring applied disk brake (not shown) engaged by a brake cam actuator assembly (not shown) so that agitator 24 rotates while clothes basket 22 remains stationary. Whenever clothes basket 22 is to be rotated for centrifugal extraction of liquid from clothes in clothes basket 22, the brake cam actuator assembly releases the disk brake, allowing agitator 24 and clothes basket 22 to spin together.

FIG. 2 is a perspective view of PSC motor 32 including a frame 50 and a stator assembly 52 having a start or auxiliary winding (not shown in FIG. 2) and a main winding (not shown in FIG. 2) positioned therein and electrically connected in parallel. A capacitor (not shown in FIG. 2) is permanently connected in series with the start or auxiliary winding. Frame 50 includes upper and lower cross-shaped members 54, 56 connected by a plurality of fastener members 58 that extend through openings (not shown) in washing machine cabinet 12 for fastening motor 32 to washing machine cabinet housing 12 (shown in FIG. 1). Annular portions 60, 62 extend from upper and lower cross-shaped members 54, 56, respectively, and circumscribe stator assembly 52. A rotor assembly (not shown in FIG. 2) is rotatably mounted and extends through a bore (not shown) in stator assembly 52. A motor output shaft 64 is coupled to the rotor assembly for rotary movement when the stator windings are energized. Motor output shaft 64 includes an integral pulley 66 for coupling to transmission 36 (shown in FIG. 1) with transmission belt 40 (shown in FIG. 1).

FIG. 3 is a broken away view of motor 32 illustrating rotor assembly 70 mounted within stator assembly 52 inside frame 50. Rotor assembly 70 has a high resistance to balance electromagnetic losses in the main and start windings. Therefore, a sufficient starting torque is generated with an acceptable temperature rise to allow starting of motor 32 without the use of slipping mechanisms to mechanically unload motor 32. Therefore, reliability concerns of known slipping clutch mechanisms are avoided.

Motor 32 generates sufficient torque to rotate clothes basket 22 (shown in FIG. 1) and/or agitator 24 (shown in FIG. 1) with an inrush current that is sufficiently low to avoid tripping of household circuit breakers and/or opening of household fuses. Therefore, washing machine 10 (shown in FIG. 1) may be powered by conventional residential power systems (not shown) without modification.

FIG. 4 is a circuit schematic of windings for motor 32 including a first and second main windings, complementary first and second sets of start windings, and extended main windings selectively connected to the first and second main windings for adjusting an operating strength of motor 32. More specifically, in an exemplary embodiment motor 32 includes a set of 2 pole start windings 80, a set of 4 pole start windings, 82 a run capacitor 84 connected to the start windings, a pair of main windings 90, 92 selectively energized for dual speed operation of motor 32, and extended main windings 94 coupled to main windings 90. 92 for energization by a power source (not shown). The power source is selectively connected to a plurality of terminals T1, T2, T3, T4, T5, and T6 with first and second AC power lines (not shown) to complete an electrical circuit through the motor windings in a manner described below. Known switches (not shown) are selectively opened and closed to connect and disconnect the power lines to the terminals. It is believed that those in the art of motor controls could accomplish the following control schemes without detailed explanation of the switches.

In a first mode of operation, and more specifically, a 2 pole operation of motor 32, the first power line is connected and switched to terminals T1 and T4, and the second power line is connected and switched to terminals T2, T3, and T6. Therefore, current flows through 2 pole start windings 80, extended main windings 94, and both main windings 90, 92 to start motor 32 through run capacitor 84. Main windings 90, 92 are connected in parallel, and cooperate with extended windings 94 to maintain rotation of motor shaft 64 (shown in FIGS. 2 and 3) after motor startup.

Extended main windings 94 allow adjustment, or tuning of motor strength between 2 pole and 4 pole motor operation. The magnitude of the adjustment may be varied by adding and removing turns in extended windings 94. By energizing extended main windings 94, motor 32 can be operated at a strength greater than a conventional 2 pole motor, but less than a conventional 4 pole motor. In other words, motor 32 can be adjusted or tuned to different strengths or outputs beyond conventional 2 pole parallel main 4 pole series main motors. This tuning capability allows wider speed distinctions relative to conventionally used 4 pole/6 pole split phase and capacitor start motors. Greater speed distinction facilitates improved system performance. For example, a lower spin speed in a washing machine facilitates a gentler wash cycle and further may reduce a likelihood of suds lock that may frictionally, and undesirably, lock washing machine components in use.

In a second mode of operation, and more specifically 4 pole operation of motor 32, the first power line is connected and switched to terminals T3 and T5, and the second power line is connected to terminals T2, and T6. Therefore, current flows through 4 pole start windings 82 and main windings 90, 92 to start motor 32 through run capacitor 84. Main windings 90, 92 are connected in series to maintain rotation of motor shaft 64 (shown in FIGS. 2 and 3) after motor startup, and extended windings 94 are electrically disassociated from the circuit. Motor 32 may therefore be operated in first and second speeds corresponding to the first and second modes of operation with appropriate switching of terminals T1, T2, T3, T4, T5, and T6. Appropriate switching of the terminals to change motor speed may occur in response to external switching on the motor.

Unlike conventionally used 4 pole/6 pole split phase and capacitor start motors that may be started in one speed only through the use of slipping mechanisms and clutches during motor startup, motor 32 may be started in either high seed or low speed by switching to the applicable start windings 80, 82, and sufficient starting torque is generated without employing clutch mechanisms to unload the motor during startup.

Further, because start windings 80, 82 and main windings 90, 92 are connected in parallel, both the main and applicable start windings are always in the motor circuit. Therefore, a cutout switch is not required, and associated reliability concerns common to split phase and capacitor start motors are avoided. Also in comparison to known split phase and capacitor start motors, permanent spit capacitor motor 32 operates with relatively low torque pulsation, thereby avoiding unpleasant noise and reducing instances of line and field rejects of motors used in certain applications, such as household appliances, and more particularly in washing machines, such as washing machine 10.

FIG. 5 schematically illustrates a control system 100 for accomplishing switching of winding terminals and regulating speed reduction. Control system 100 includes a controller 102 operatively coupled to motor 32, and more specifically to motor windings 32 for selectively energizing the first and second main windings, complementary first and second sets of start windings, and extended main windings as described above for operating motor 32 in first and second speeds. It is believed that those in the art of motor control systems could construct a mechanical, electronic, or electromechanical controller 102 to achieve switching of the windings without further explanation of the controller. In different embodiments, controller 102 may be used to energize the desired motor windings and operate motor 32 with and without feedback control.

In a further embodiment, clutchless motor drive system 30 includes phase control for limited speed reduction. A speed sensor 106 is coupled to controller 102, and controller 102 adjusts a phase angle of the applied voltage to applicable motor windings 104 to achieve a selected operating speed of motor 32. The power phase may be corrected by a triac (not shown) connected in series with motor windings 104 and operationally responsive to signals from controller 102. Speed sensor 106 is one of a variety of a known transducers coupled to motor 32, such as for example, a transducer coupled to motor shaft 64 (shown in FIG. 2) for sensing an operating speed of motor 32 and second corresponding electrical signals to controller 102 for motor control.

While the 2 pole/4 pole PSC motor embodiment with tuning capability (described above in relation to FIG. 4) is believed to be the most cost effective solution to reliability and expense issues with conventional motor drive systems employing clutch mechanisms and more expensive motors, other alternative embodiments of clutchless other motor configurations and windings may be employed. More specifically, other configurations of first and second main windings and complementary start windings may be employed in motor drive system 30 (shown in FIG. 1) with or without extended main windings to achieve reliable two speed motor performance, albeit with some performance and cost fluctuation.

For example, in one alternative embodiment, motor drive system 30 is started with a 4 pole PSC winding and switched to a 6 pole split phase winding as necessary with conventional external switching on the motor or in response to washing machine backlash to achieve acceptable two speed operation of washing machine 10. Conversely, In another alternative embodiment, clutchless motor drive system 30 is started with a 6 pole PSC winding and switched to a 4 pole split phase winding as necessary with external switching, such as a triac, a board on the motor. If phase control is implemented with a triac (as described above in relation to FIG. 5), the triac could be used both for phase control and to switch the motor windings for high and low speed operation of motor 32.

In a further alternative embodiment, a 4 winding motor with a 2 pole PSC winding and a 4 pole PSC winding could be employed in clutchless motor drive system 30. This is similar to the embodiment described above in relation to FIG. 4 but without employing extended mains 94 (shown in FIG. 4).

In yet another alternative embodiment, a 4 winding motor including a 4 pole PSC winding and a 6 pole PSC winding could be employed in clutchless motor drive system 30 for reliable two speed operation.

In still another alternative embodiment, a 3 winding motor with a 2 pole main winding, a 4 pole main winding and a 2 pole start winding is employed to create a 2 pole/4 pole PSC motor for use in clutchless motor drive system 30. In this embodiment, the motor is started only in a 2 pole operation mode and subsequently switched to 4 pole operation as desired.

The above-described alternative embodiments could be implemented with switching schemes similar to that shown and described above in relation to FIG. 4 and using a control system similar to control system 100 shown and described above in relation to FIG. 5.

Thus, washing machine 10 (shown in FIG. 1) is provided with increased performance and with increased reliability by virtue of clutchless motor drive system 30 and a lower cost 2 pole/4 pole PSC motor 32 in comparison to known washing machines employing a conventional 4 pole/6 pole split phase or capacitor start motor motors. Field rejects due to large torque pulsation are consequently reduced, and elimination of cutout switches and mechanical slipping mechanisms further reduces manufacturing complexity and cost for washing machine 10.

While the invention has been described in terms of various specific embodiments, those skilled in the art will recognize that the invention can be practiced with modification within the spirit and scope of the claims.

What is claimed is:

1. A motor drive system comprising:
   an electric motor including a rotor shaft, a first main winding and a second main winding, said first and second main windings selectively energizable to operate the motor at first and second speeds, at least one of said windings comprising a permanent split capacitor winding; and
   a transmission coupled to said rotor shaft, said shaft engaging said transmission without employing a clutch mechanism.

2. A motor drive system in accordance with claim 1 wherein said rotor shaft extends vertically.

3. A motor drive system in accordance with claim 2 wherein said rotor shaft comprises a pulley.

4. A motor drive system in accordance with claim 3 further comprising a belt coupled to said pulley and engaging said transmission.

5. A motor drive system in accordance with claim 1, said motor further comprising a first start winding for rotating said motor shaft with said first main winding.

6. A motor drive system in accordance with claim 5 wherein said first start winding comprises a 2 pole start winding.

7. A motor drive system in accordance with claim 5 further comprising a second start winding for rotating said motor shaft with said second main winding.

8. A motor drive system in accordance with claim 7, said second start winding comprising a 4 pole start winding.

9. A motor drive system in accordance with claim 7 further comprising an extended main winding for tuning a strength of said motor.

10. A motor drive system in accordance with claim 1, said motor configured for starting using either said first main winding or said second main winding.

11. A motor drive system in accordance with claim 10 further comprising a controller for selectively energizing said first main winding and said second main winding.

12. A vertical axis washing machine comprising;
a cabinet housing;
a clothes basket disposed within said cabinet housing; and
a two speed electric motor mounted within said cabinet, said motor including a vertically oriented rotor shaft, a first main winding and a second main winding, at least one of said windings comprising a permanent split capacitor winding, said motor drivingly engaging said clothes basket without employing a clutch mechanism.

13. A washing machine in accordance with claim 12, said motor further comprising a first start winding for rotating said motor shaft with said first main winding.

14. A motor drive system in accordance with claim 13 wherein said first start winding comprises a 2 pole start winding.

15. A motor drive system in accordance with claim 12 further comprising a second start winding for rotating said motor shaft with said second main winding.

16. A motor drive system in accordance with claim 15, said second start winding comprising a 4 pole start winding.

17. A motor drive system in accordance with claim 15 further comprising an extended main winding for tuning a strength of said motor.

18. A motor drive system in accordance with claim 12, said motor configured for starting in either speed of the motor.

19. A motor drive system in accordance with claim 18 further comprising a controller for selectively energizing said first main winding and said second main winding.

20. An appliance comprising:
a cabinet housing;
a rotatable element situated within said cabinet housing for rotary movement to execute an appliance operational cycle;
an electric motor coupled to said cabinet for driving engagement of said rotatable element, said motor comprising at least one winding configured as a permanent split capacitor winding, said motor operable in a first mode at a first speed and a second mode at a second speed, said motor configured for motor startup in said first mode of operation and configured for startup in said second mode of operation, wherein said motor is configured for motor startup without employing a clutch mechanism.

21. An appliance in accordance with claim 20 wherein one of said first mode of operation and said second mode of operation comprises energization of a 2 pole winding.

22. An appliance in accordance with claim 20 wherein one of said first mode of operation and said second mode of operation comprises energization of a 4 pole winding.

23. An appliance in accordance with claim 20 further comprising a first main winding, a second main winding and an extended main winding coupled to said first main winding and said second main winding, said main winding tuning motor operation to a mode between said first mode of operation and said second mode of operation.

* * * * *